US007658078B2

(12) United States Patent
Nishida et al.

(10) Patent No.: US 7,658,078 B2
(45) Date of Patent: Feb. 9, 2010

(54) SYSTEM FOR REFORMING HEAVY OIL, METHOD THEREFOR, AND COMBINED CYCLE POWER SYSTEM (75) Inventors: Koji Nishida, Hitachiohta (JP); Nobuyuki Hokari, Hitachinaka (JP); Shin-ichi Inage, Hitachi (JP); Osami Yokota, Hitachinaka (JP); Hirokazu Takahashi, Hitachinaka (JP); Masahiko Yamagishi, Hitachinaka (JP); Akinori Hayashi, Hitachinaka (JP)

(73) Assignees: Hitachi, Ltd., Tokyo (JP); Petroleum Energy Center, Tokyo (JP)

( * ) Notice: Subject to any disclaimer, the term of this patent is extended or adjusted under 35 U.S.C. 154(b) by 566 days.

(21) Appl. No.: 11/192,059

(22) Filed: Jul. 29, 2005

(65) Prior Publication Data
US 2006/0057059 A1 Mar. 16, 2006

(30) Foreign Application Priority Data
Aug. 3, 2004 (JP) ............................. 2004-226629

(51) Int. Cl.
F02C 6/18 (2006.01)
(52) U.S. Cl. ................. 60/780; 60/39.182; 60/39.464; 48/215
(58) Field of Classification Search ............ 60/780, 60/39.182, 39.461, 39.464; 48/215, 214 R
See application file for complete search history.

(56) References Cited

U.S. PATENT DOCUMENTS 2,976,134 A 3/1961 Paull
3,401,110 A * 9/1968 Floyd et al. ............... 208/391
4,099,374 A * 7/1978 Foster-Pegg ............. 60/39.12
4,543,177 A 9/1985 Murthy et al.
6,298,651 B1 * 10/2001 Iijima ......................... 60/780
7,347,051 B2 * 3/2008 Christensen ................ 60/780
2005/0072137 A1 * 4/2005 Hokari et al. ............. 60/39.461
2007/0283701 A1 * 12/2007 Yokota et al. ................ 60/780

FOREIGN PATENT DOCUMENTS

| EP | 1342771 A1 | 9/2003 |
| JP | 6-346061 A | 12/1994 |
| JP | 3033412 U | 10/1996 |
| JP | 11-80750 | 3/1999 |
| JP | 2000-212573 A | 8/2000 |
| JP | 2001-279256 A | 10/2001 |
| JP | 200212917 | 5/2002 |
| JP | 2004-83694 A | 3/2004 |

* cited by examiner

Primary Examiner—William H Rodríguez
(74) Attorney, Agent, or Firm—Mattingly & Malur, PC (57) ABSTRACT A heavy oil reforming system includes a reforming preheater raising the temperature of a mixed fluid comprising a high pressure heavy oil and high pressure steam up to a temperature for reforming reaction. The mixed fluid having been heated up to the temperature for reforming reaction is introduced into a reformer kept at the temperature for reforming reaction and thereby the heavy oil is reformed. This reforming system allows the attainment of a residence time of 1 to 10 min necessary for reforming in a uniform or nearly uniform temperature field, thereby implementing the manufacturing of reformed fuels from a large volume of heavy oil.

7 Claims, 8 Drawing Sheets

SECTION A-A

FIG. 9

SYSTEM FOR REFORMING HEAVY OIL, METHOD THEREFOR, AND COMBINED CYCLE POWER SYSTEM

BACKGROUND OF THE INVENTION

1. Field of the Invention

The present invention relates to a heavy oil reforming system and method in which a heavy oil is allowed to react with high pressure steam at a high temperature without catalysis and decomposed to thereby generate a reformed light oil. The present invention also concerns a combined cycle power system generating electric power by using the aforementioned reformed oil as a gas turbine fuel, and concurrently generating electric power by recovering the potential heat of exhaust gas from the gas turbine and producing steam to drive a steam turbine.

2. Description of the Related Art

There has hitherto been known a combined cycle power system in which a heavy oil is mixed with water and decomposed under a reaction condition to attain the supercritical state or nearly supercritical state of water, and in which the reformed oil thus generated is used as a gas turbine fuel to generate electric power, while recovering a potential heat of exhaust gas from the gas turbine to produce steam, thereby driving a steam turbine to generate electric power (see, for example, JP, A 11-80750: Abstract)

SUMMARY OF THE INVENTION

When reforming a heavy oil, it is generally desirable to heat a mixed fluid of a heavy oil and water at a temperature on the level of 350 to 550° C. in a short time, as well as to secure a residence time of 1 to 10 min. Methods for raising the temperature of the mixed fluid up to 350 to 550° C. include a method by which the temperature of heating steam is raised, and a method by which the amount of heat transfer between the heating steam and the mixed fluid is enhanced by increasing the speed of the mixed fluid.

Regarding the former method, because the allowable stress of the reformer material steeply decreases at a temperature beyond a certain value, it is impossible to increase the steam temperature without limitation. For example, in the case where SUS 316 is used as a material of the reformer, the stress steeply falls in the vicinity of 550° C.

On the other hand, if the speed of the mixed fluid in the reformer is increased, the following problem occurs. Provided the inner diameter of the reformer is fixed, when attempting to increase the speed of the mixed fluid by n-times, the height of the reformer must be increased by n-times to secure a due residence time. For example, letting the speed of the mixed fluid in a reformer vessel to be 0.5 m/sec, a vessel height of 30 m is needed for securing the shortest possible residence time of 1 min.

Conversely, if the speed of the mixed fluid is low, not only the amount of heat transfer between the heating steam and the mixed fluid decreases, but also the production volume of a reformed fuel decreases. Furthermore, the heavy oil adhering to the heat transfer surface of the reformer is exposed to a high temperature field for a long time, so that there occurs a possibility that the heavy oil is subjected to coking. Coke, having a lower thermal conductivity than a metal as the vessel material of the reformer, constitutes a thermal resistance between the heating steam and mixed fluid. This might make it impossible to heat the mixed fluid up to a temperature of 350 to 550° C., which is a suitable reaction temperature for reforming.

The present invention is directed to a heavy oil reforming system and method that allow the mixed fluid to react in a short time in the reformer without raising the temperature of steam for heating the heavy oil more than necessary, or without making the height of the reformer larger than necessary. The present invention is also directed to a combined cycle power system with heavy oil.

The present invention provides a heavy oil reforming system including a gas-liquid mixer for mixing a high pressure heavy oil and high pressure steam, a reforming preheater heating the mixed fluid having been mixed in the gas-liquid mixer up to a temperature for reforming reaction, and a reformer kept at the temperature for reforming reaction. This heavy oil reforming system introduces the mixed fluid heated by the reforming preheater up to the temperature for reforming reaction, into the reformer kept at the temperature for reforming reaction, thereby reforming the heavy oil.

According to the present invention, it is possible to easily attain a reaction temperature of 350 to 550° C. and a residence time of 1 to 10 min in the reformer without raising the temperature of steam for heating the heavy oil more than necessary, or without making the height of the reformer larger than necessary.

DESCRIPTION OF THE PREFERRED EMBODIMENTS

The heavy oil reforming method according to the present invention includes the steps of: mixing a high pressure heavy oil and high pressure steam; previously heating the mixed fluid up to a temperature necessary to reform the heavy oil; and thereafter introducing the mixed fluid into the reformer kept at the temperature for reforming reaction, thereby reforming the heavy oil.

The combined cycle power system according to the present invention includes a power generation apparatus generating electric power by using the reformed oil produced by the above-described heavy oil reformer as a gas turbine fuel, a steam boiler producing steam by recovering potential heat of exhaust gas from the gas turbine, and a power generation apparatus generating electric power by driving the steam turbine using steam produced by the steam boiler. Herein, steam for reforming heavy oil to be introduced into the reformer is produced by the above-described steam boiler.

In the present invention, the mixed fluid of the heavy oil and steam is heated in advance up to a temperature on the level of 350 to 550° C., which is a reaction temperature level suitable for reforming, by the reforming preheater, rather than it is heated up to a temperature of 350 to 550° C. after having been introduced into the reformer. Therefore, in the reformer, the temperature and residence time suitable for reforming can be easily secured.

By establishing such a reforming reaction process, it is possible to allow the mixed fluid to react in a short time in the reformer without raising the temperature of steam for heating heavy oil more than necessary, or without making the height of the reformer larger than necessary. Moreover, in the present invention, because the reforming reaction can occur in a substantially uniform temperature field, a reformed fuel having a substantially uniform composition and capable of easily running the gas turbine can be produced. Furthermore, the present invention enables the reforming of a large volume of heavy oil.

Here, a description will be made of the range of temperature and pressure suitable for the reforming reaction of heavy oil.

Figure 2:
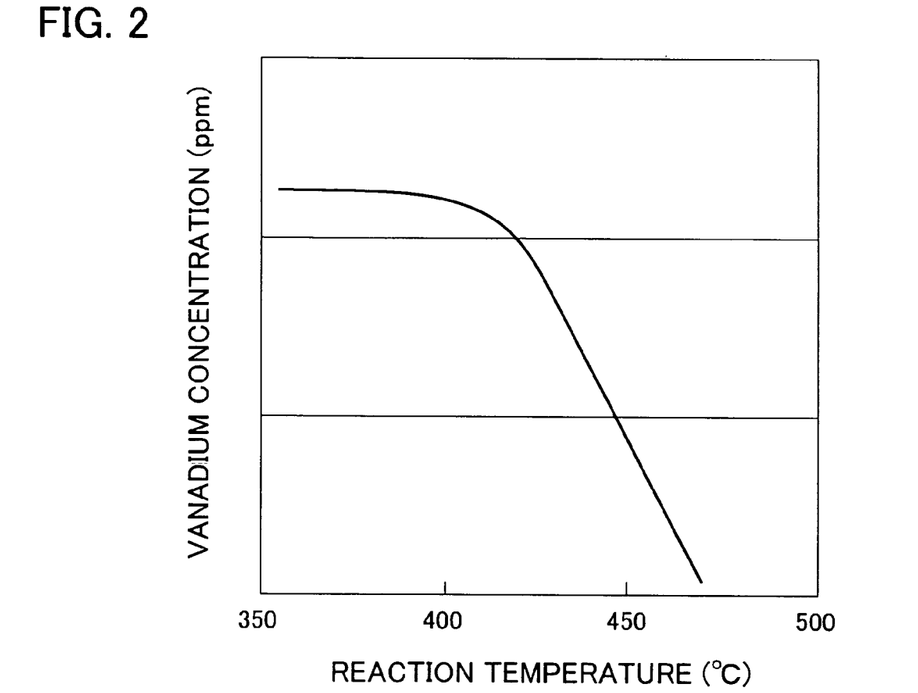
FIG. 2 is a diagram showing the relationship between the vanadium concentration and the reaction temperature.
Figure 3:
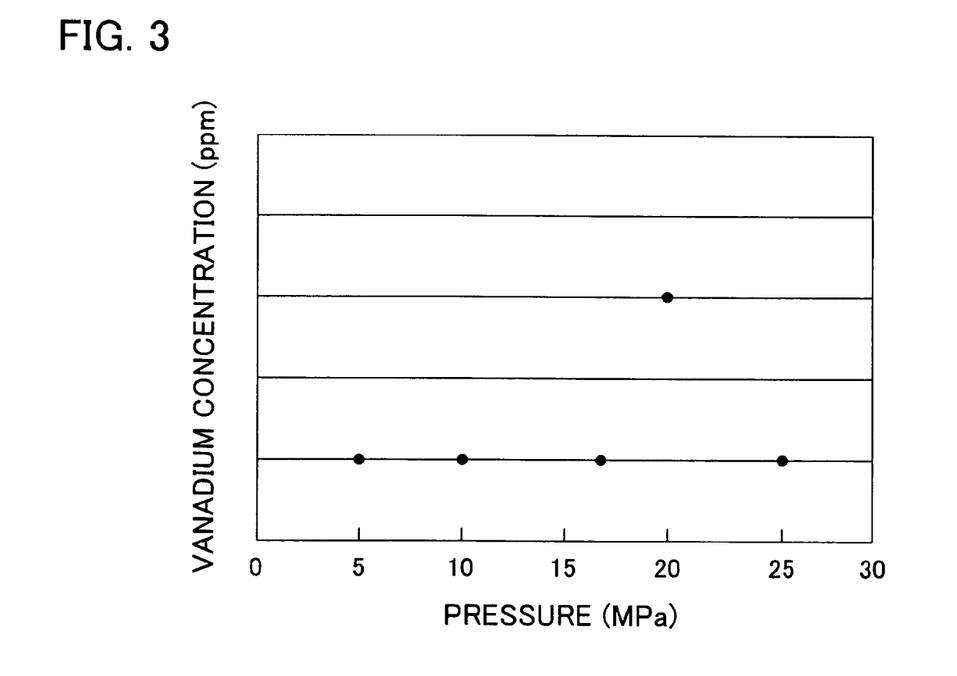
FIG. 3 is a diagram showing the relationship between the vanadium concentration and the pressure.

When employing a heavy oil as a gas turbine fuel, it is desirable to reduce vanadium that can corrode turbine blades. The present inventors investigated, in their fundamental experiments, the influence of the reaction temperature and pressure upon the vanadium concentration in the reformed oil obtained by reforming a heavy oil. FIGS. 2 and 3 show the results.

FIG. 2 illustrates the relationship between the reaction temperature and the vanadium concentration. The vanadium concentration on the longitudinal axis is expressed in a logarithmic scale. In the experimental temperature range of not lower than 350° C., the vanadium concentration decreased as the reaction temperature increased. When applying the heavy oil reforming system according to the present invention to a gas turbine system, provided a stainless steel material, which is comparatively inexpensive, is employed, it is desirable that the reaction temperature range be not higher than 550° C., in which range the allowable stress of a reformer material does not steeply fall. Hence, the temperature range of 350 to 550° C. is suitable for the reaction temperature.

FIG. 3 illustrates the relationship between the pressure and the vanadium concentration under a reaction temperature condition of 450° C. Under the experimental pressure condition of 5 to 30 MPa, the vanadium concentration is lower than that under the pressure condition of 20 MPa. Thus, it was ascertained that the pressure of 5 to 30 MPa presents no problem as a pressure condition for producing the reformed fuel.

The above-described experimental results indicate that, as reforming reaction conditions, the pressure range of 5 to 30 MPa, and the temperature range of 350 to 550° C. are suitable for the application of this heavy oil reforming system to the gas turbine system.

Other features of the present invention will become apparent in the following description of embodiments and the accompanying drawings wherein the same or equivalent components are designated by the same reference numerals to avoid redundant explanation.

First Embodiment

Figure 1:
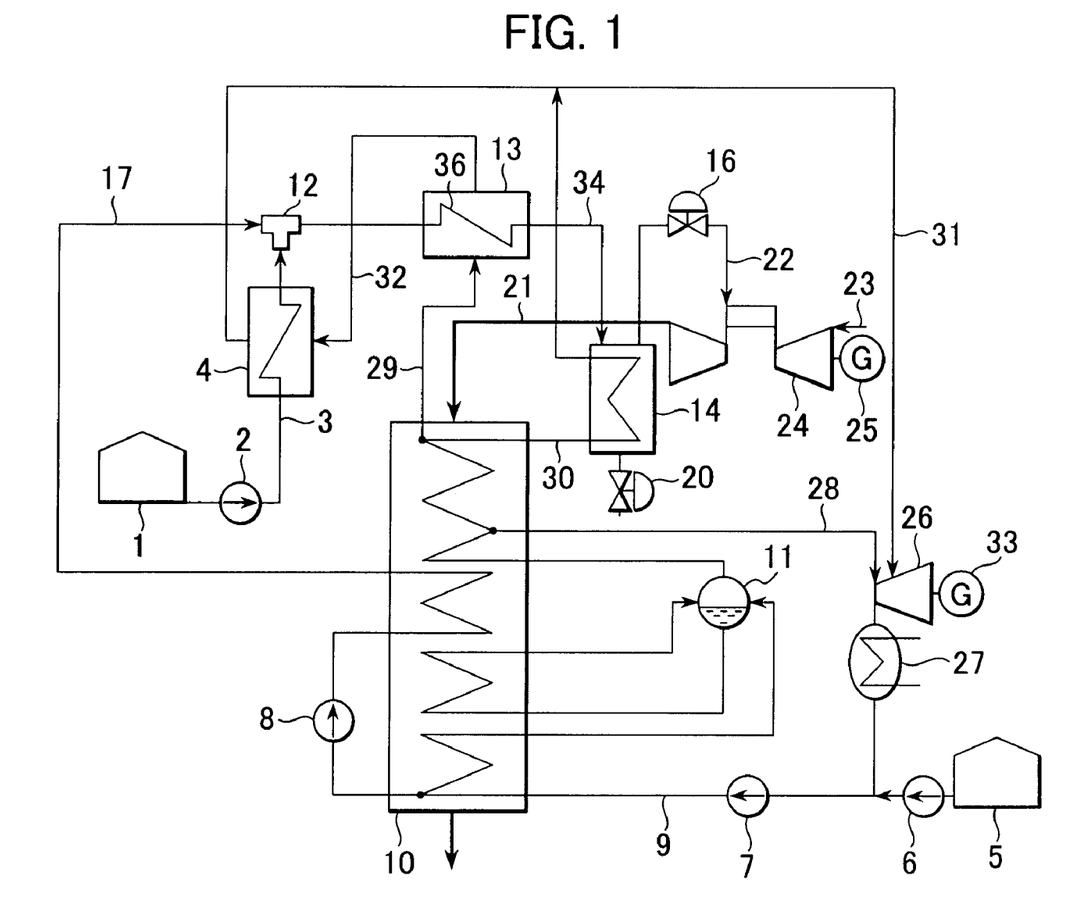
FIG. 1 is a schematic view of a combined cycle power system operated on a reformed heavy fuel, according to a first embodiment of the present invention.

First, a combined cycle power system with heavy oil according to a first embodiment of the present invention will be described with reference to FIG. 1.

The power generation system according to this embodiment includes: a gas turbine 24, a steam boiler 10 recovering potential heat of gas turbine exhaust gas 21 and generating steam, a steam turbine 26 driven by the steam produced by the steam boiler 10, a reformer 14 for reforming a heavy oil, a reforming preheater 13 for preheating the heavy oil and steam to be supplied to the reformer, and a gas-liquid mixer 12 for mixing the heavy oil and steam.

The heavy oil 3 having been supplied from a heavy oil tank 1 is sent to a heavy oil preheater 4, and is pressurized by a heavy oil booster pump 2 up to a pressure of 5 to 30 MPa, while being heated by steam 32 for heating heavy oil preheater up to a temperature not more than 350° C., which is the highest possible temperature that causing no coking. On the other hand, water 9 having been supplied from a water tank 5 by a feed water pump 6 is supplied to the steam boiler 10 through a circulating water pump 7, and pressurized in the water booster pump 8 while being heated in the steam boiler 10 until the water 9 becomes a steam at a pressure of 5 to 30 MPa and at a temperature of 350 to 550° C. The steam 17 and heavy oil 3 each of which has been pressurized and heated are mixed in the gas-liquid mixer 12, thus forming a mixed fluid. The temperature of the mixed fluid decreases due to the temperature difference between the steam and the heavy oil, with the result that the vanadium concentration in the reformed oil becomes higher.

In order to reduce the vanadium concentration in the reformed oil, the mixed fluid of which the temperature has decreased is passed through a heat exchanger tube 36 in the reforming preheater 13 at a high speed to increase the heat transfer coefficient in the tube, and is heated in a short time by steam 29 for heating reforming preheater, outside the heat exchanger tube 36. This steam 29 for heating reforming preheater is produced by the steam boiler 10. The mixed fluid 34 having attained a temperature on the level of 350 to 550° C., which temperature is a temperature condition to allow the reforming reaction necessary for producing a reformed oil to occur in a satisfactory manner, flows into the reformer 14. In the reformer 14, a temperature of 350 to 550° C. is maintained by a steam 30 for heating reformer supplied from the steam boiler 10 while a residence time of 1 to 10 min necessary for reforming reaction is satisfied.

Here, the heavy oil and steam may be mixed in the gas-liquid mixer 12 each at a lower temperature, and thereafter this mixed fluid may be heated in the reforming preheater 13 up to a temperature of 350 to 550° C.

The reformed oil 22 having been generated in the reformer 14 is depressurized to a predetermined operational pressure by a pressure reducing control valve 16 provided in a reformed fuel supply system. On the other hand, tar having not been reformed in the reformer 14 is extracted outside the system by a tar extraction valve 20. The reformed oil 22, after having being depressurized, is supplied to the gas turbine 24 together with air 23 to drive the turbine 24, thereby obtaining electric power using a power generator 25. Furthermore, steam 28 for steam turbine generated by the steam boiler 10, and all of the steam 31 extracted from the heavy oil preheater 4 is supplied to the steam turbine 26 to drive the turbine 26, thereby obtaining electric power using a power generator 33. Exhaust steam from the steam turbine 26 passes through a condenser 27, and after having been mixed with water supplied from the water tank 5, it is sent to the steam boiler 10. Here, reference numeral 11 in FIG. 1 denotes a steam drum.

In the above-described embodiment, a single reforming preheater 13 and a single reformer 14 are put to use, but depending on a flow amount of a reformed fuel or reformed oil, a plurality of reforming preheaters and reformers may also be arranged in parallel.

Also, by arranging the heat exchanger tube in the reforming preheater 13 with a difference in elevation provided so that the entrance side of the mixed fluid becomes higher than the exit side, it is possible to cause the oil having a higher specific gravity than steam to flow out even more smoothly from the reforming preheater to the reformer. The oil accumulated in the lower portion of the reforming preheater can be extracted outside the system by the tar extraction valve 20 during steady operation, as in the case of the tar having not been reformed in the reformer.

With the above-described features of this embodiment, since the mixed fluid flows at a high speed through the reforming preheater, it is possible to prevent the coking of the heavy oil, as well as clean out coked heavy oil at the startup and shutdown of the system by a high speed steam flow. Moreover, the reduction in the amount of heat transfer between the heating steam and the mixed fluid can be inhibited, and at the system shutdown, the oil in the reforming preheater can be eliminated to thereby reduce a potential for fire disaster.

Second Embodiment

Figure 4:
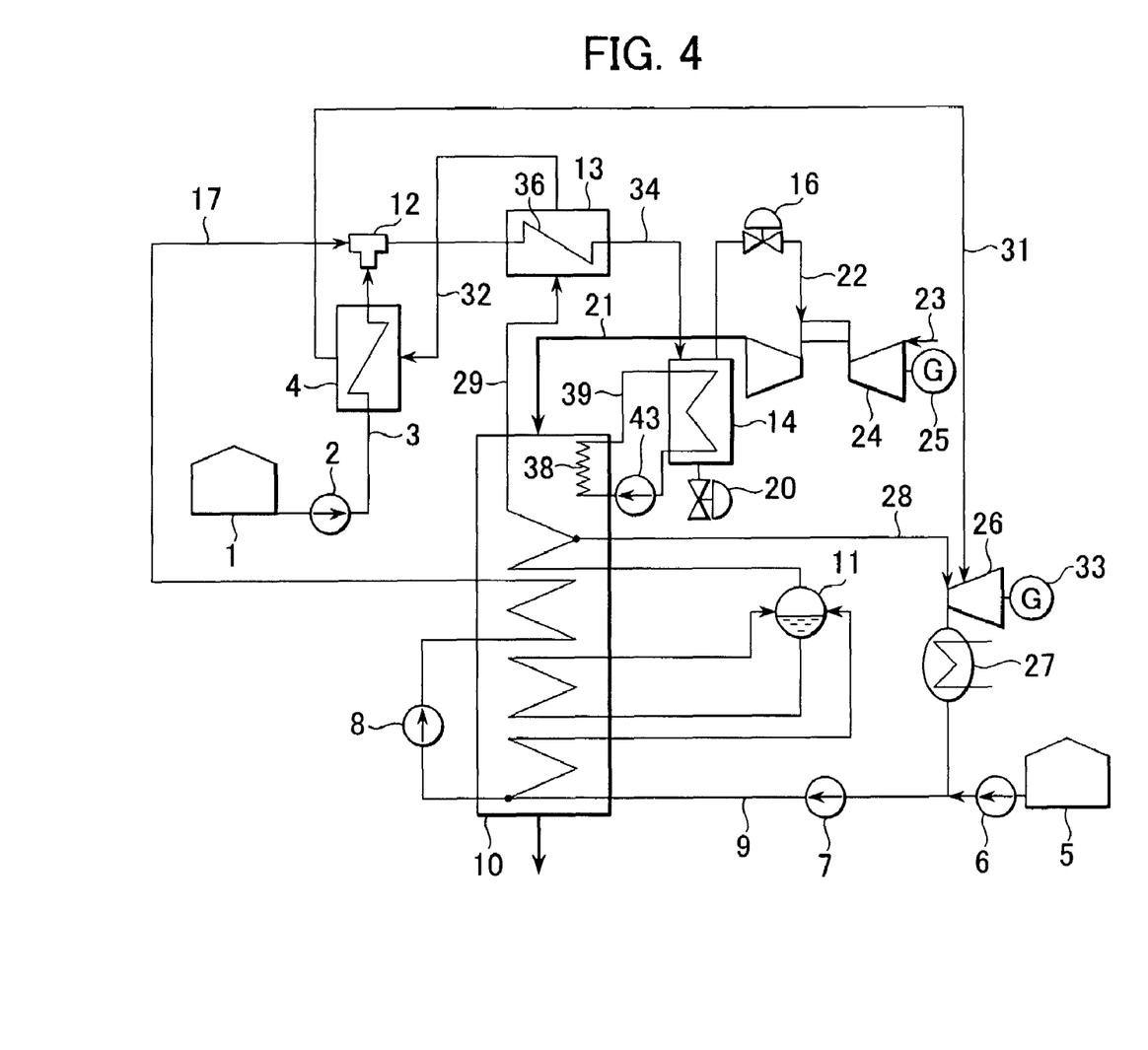
FIG. 4 is a schematic view of a combined cycle power system operated on a reformed heavy fuel, according to a second embodiment of the present invention.

A second embodiment according to the present invention will be described with reference to FIG. 4. In this embodiment, in order to keep the temperature of the mixed fluid 34 in the reformer 14 at 350 to 550° C., which is a satisfactory temperature for reforming reaction, a gas 39 such as nitrogen is employed instead of steam occurring in the steam boiler 10. The gas 39 such as nitrogen from a blower 43 is heated up to a high temperature by a heat exchanger 38 for reformer heating gas, in which exchanger is provided in the steam boiler 10, receiving the potential heat of exhaust gas 21 from the gas turbine, and it is supplied to the reformer 14 to thereby keep constant the temperature of the mixed fluid 34 in the reformer. The use of the gas instead of reformer heating gas facilitates the operation of the boiler, because the line for supplying steam to the heavy oil preheater 4 through the reforming preheater 13 and the steam turbine 26, and the line for supplying steam to the reformer 14 can be made mutually separate systems.

Third Embodiment

Figure 5:
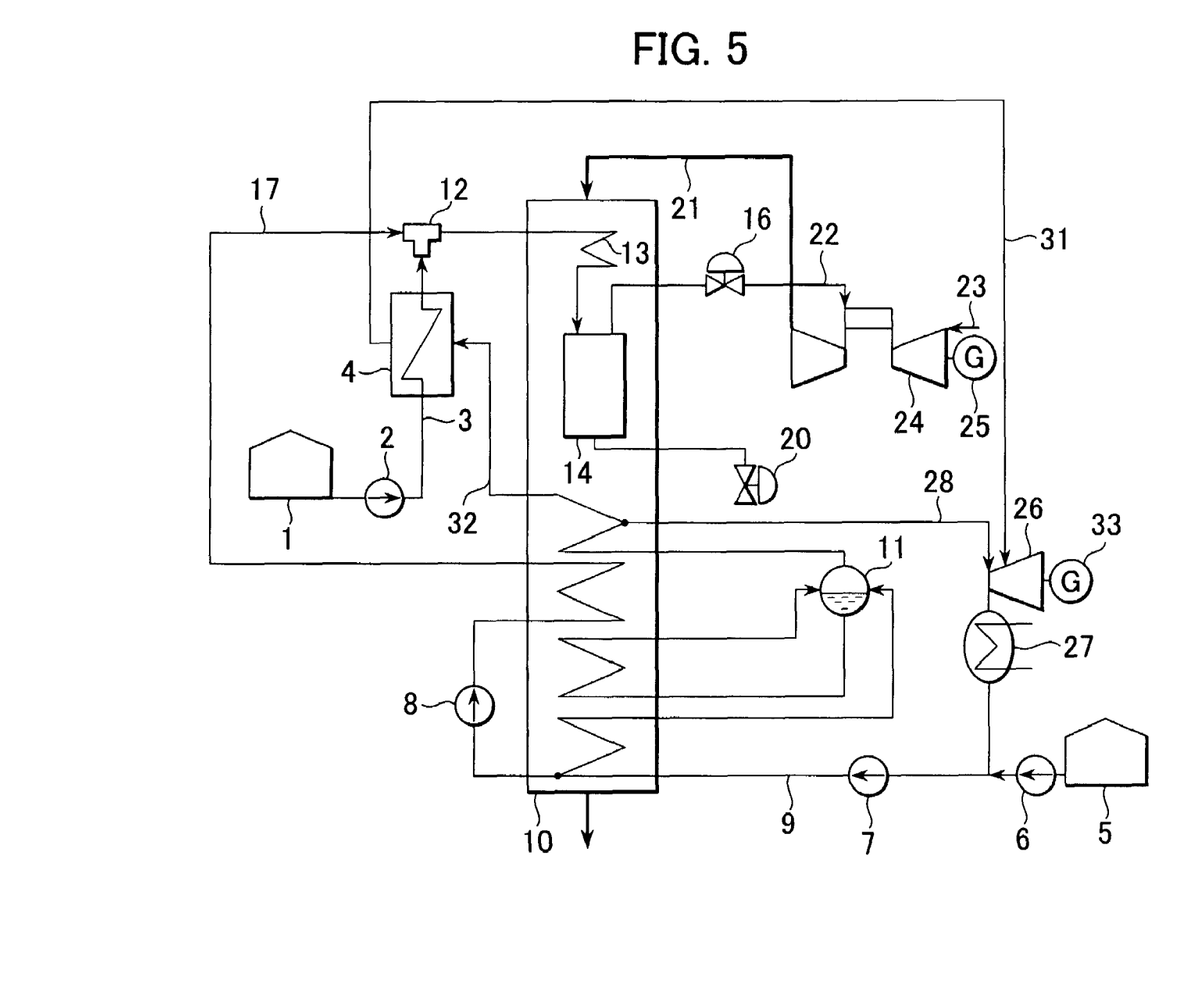
FIG. 5 is a schematic view of a combined cycle power system operated on a reformed heavy fuel, according to a third embodiment of the present invention.

A third embodiment according to the present invention will now be described with reference to FIG. 5. In this embodiment, the reforming preheater 13 and the reformer 14 are disposed in the steam boiler 10. Gas turbine exhaust gas 21 is used to heat these reforming preheater 13 and reformer 14.

According to this embodiment, a steam piping system for extracting steam can be eliminated, thereby simplifying the system.

Fourth Embodiment

Figure 6:
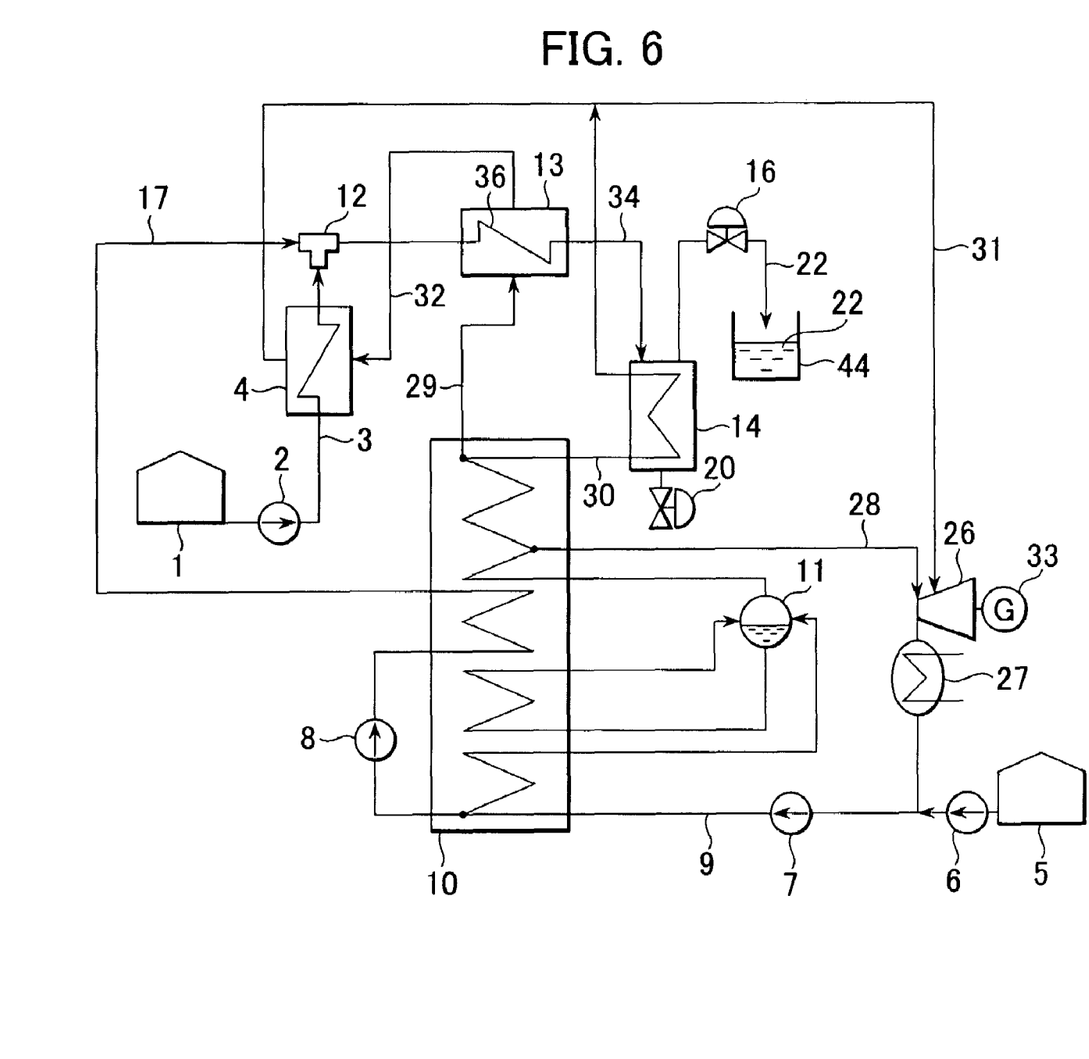
FIG. 6 is a schematic view of a power generation system according to a fourth embodiment of the present invention.

Next, a fourth embodiment according to the present invention will be described with reference to FIG. 6. In this embodiment, the reformed fuel having been produced is once accumulated in the reformed fuel tank 44 and then supplied to a gas turbine power plant or the like capable of using a reformed fuel, by means of piping or trucks, rather than it is directly supplied to the gas turbine and burned.

A system according to this embodiment has the advantage that a boiler system and a gas turbine system can be operated independently of each other.

Fifth Embodiment

A reforming preheater and reformer that are suitable for use in the heavy oil reforming system set forth in the above-described first to fourth embodiments will be described as a fifth embodiment, with reference to FIGS. 7 to 9.

Figure 7:
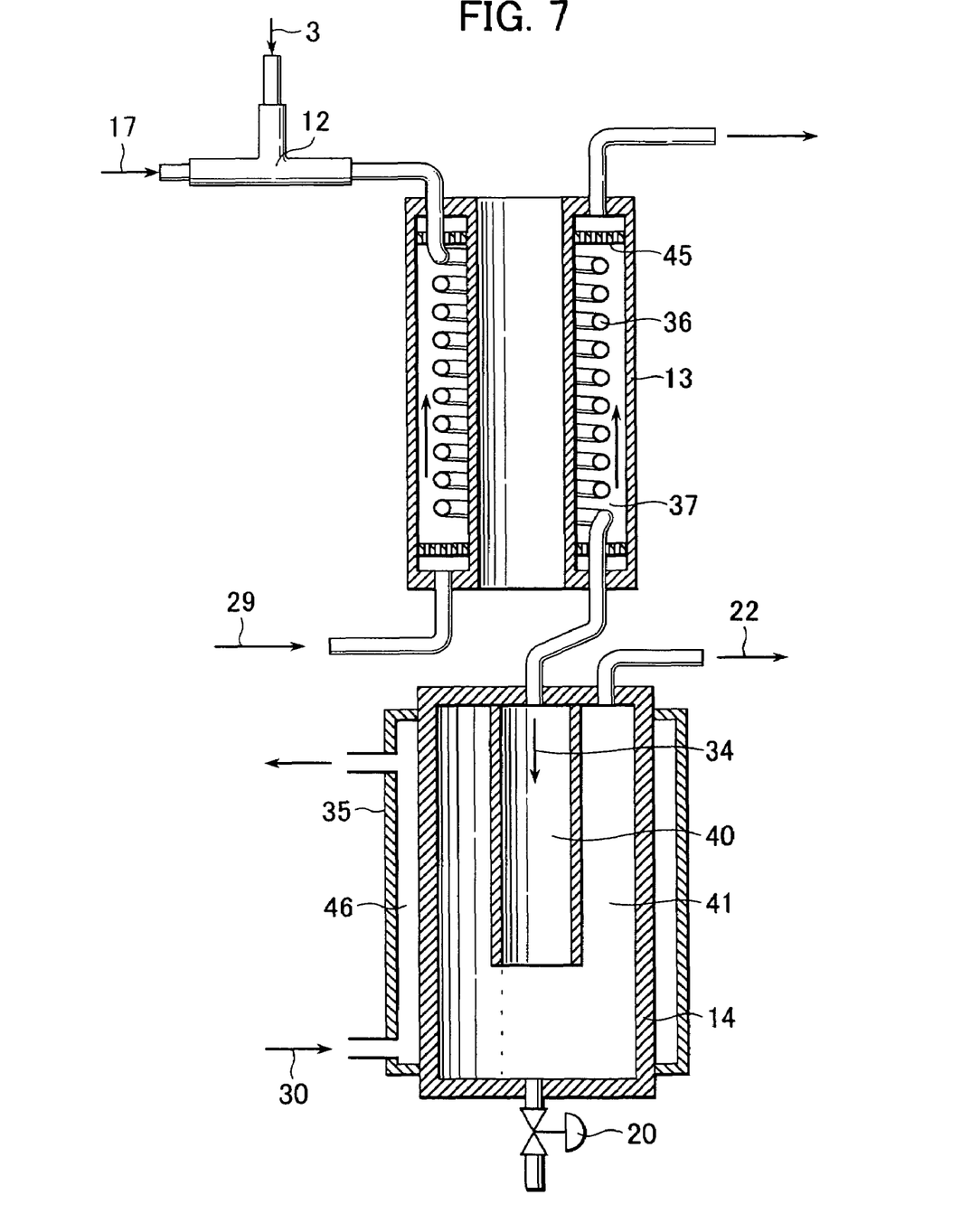
FIG. 7 is a sectional view of an embodiment (fifth embodiment) of a reforming preheater and reformer according to the present invention.

FIG. 7 shows the structures of the reforming preheater 13 and reformer 14. The mixed fluid 34 formed by mixing the heavy oil 3 and steam 17 in the gas-liquid mixer 12 is introduced into the reforming preheater 13. The reforming preheater 13 has thereinside the heat exchanger tube 36 of a spiral structure. The heat exchanger tube 36 is arranged in the vertical direction. The entrance of the heat exchanger tube 36 for the mixed fluid 34 is disposed at the upper portion of the reforming preheater 13 and the exit is disposed at the lower portion thereof. This allows the oil having a higher specific gravity than steam to smoothly flow out from the reforming preheater 13 to the reformer 14.

The mixed fluid 34 having flowed into the reformer 14 flows down through a descending flow path 40, while advancing reforming reaction. Out of the reformed oil and tar that have been produced in the reformer 14, the tar, having a high specific gravity, adheres to the lower portion of the reformer 14, and is extracted outside the system by the tar extraction valve 20. On the other hand, the reformed oil 22, having a low specific gravity, ascends through an ascending flow path 41, and after a laps of a time of 1 to 10 min, which is an optimum residence time for reforming reaction, it flows out from the reformer 14. Forming the descending flow path 40 and ascending flow path 41 in the reformer 14 allows the reformed oil 22 with a lower specific gravity and tar with a higher specific gravity to be easily separated from each other.

By virtue of the above-described features, it is possible to extract the oil in the reforming preheater 13 at system shutdown, and thereby reduce a potential for fire disaster.

The use of the heat exchanger tube 36 of spiral structure offers advantages as described below. The steam 17 and heavy oil 3 are mixed in the gas-liquid mixer 12, thus forming the mixed fluid 34. The mixed fluid 34 flows at a high speed through the heat exchanger tube 36 provided in the reforming preheater 13. The reforming preheater 13 is configured so that a high heat transfer coefficient can be obtained between the inner surface of the heat exchanger tube 36 and the mixed fluid 34. On the other hand, the steam 29 for heating reforming preheater is dispersed by a porous plate 45, as well as it flows at a high speed through a steam flow path 37 with a flow path area reduced, so that a high heat transfer coefficient can be obtained between the outer surface of the heat exchanger tube 36 and the steam 17. By increasing the heat transfer coefficients on the inside and outside of the heat exchanger tube 36, the amount of heat transfer from the steam 29 for heating reforming preheater to the mixed fluid 34 can be increased. When the amount of heat transfer is increased, a short heat exchanger tube will suffice, thereby allowing the size-reduction in the reformer 14.

The mixed fluid 34 having attained a temperature of 350 to 550° C., which is a satisfactory reaction temperature for reforming, flows into the reformer 14. The reformer 14 comprises the descending flow path 40 and ascending flow path 41. The mixed fluid 34 flows downward through the descending flow path 40, and tar with a high specific gravity adheres to the bottom surface of the reformer 14, while the reformed oil 22 with a low specific gravity flows upward through the ascending flow path 41 and flows out. A steam jacket 35 is provided on the side surface of the reformer 14. By feeding the steam 30 for heating reformer, having a temperature somewhat higher than the mixed fluid 34, through a steam flow path 46 in the steam jacket, the temperature of the reformer 14 is kept at 350 to 550° C., which is a satisfactory reaction temperature for reforming.

The above-described arrangements of the reforming preheater and reformer, makes it possible not only to produce a reformed oil having uniform or nearly uniform composition, providing a stable combustion characteristic, but also to implement the size-reduction of the system and the improvement in safety.

Figure 8:
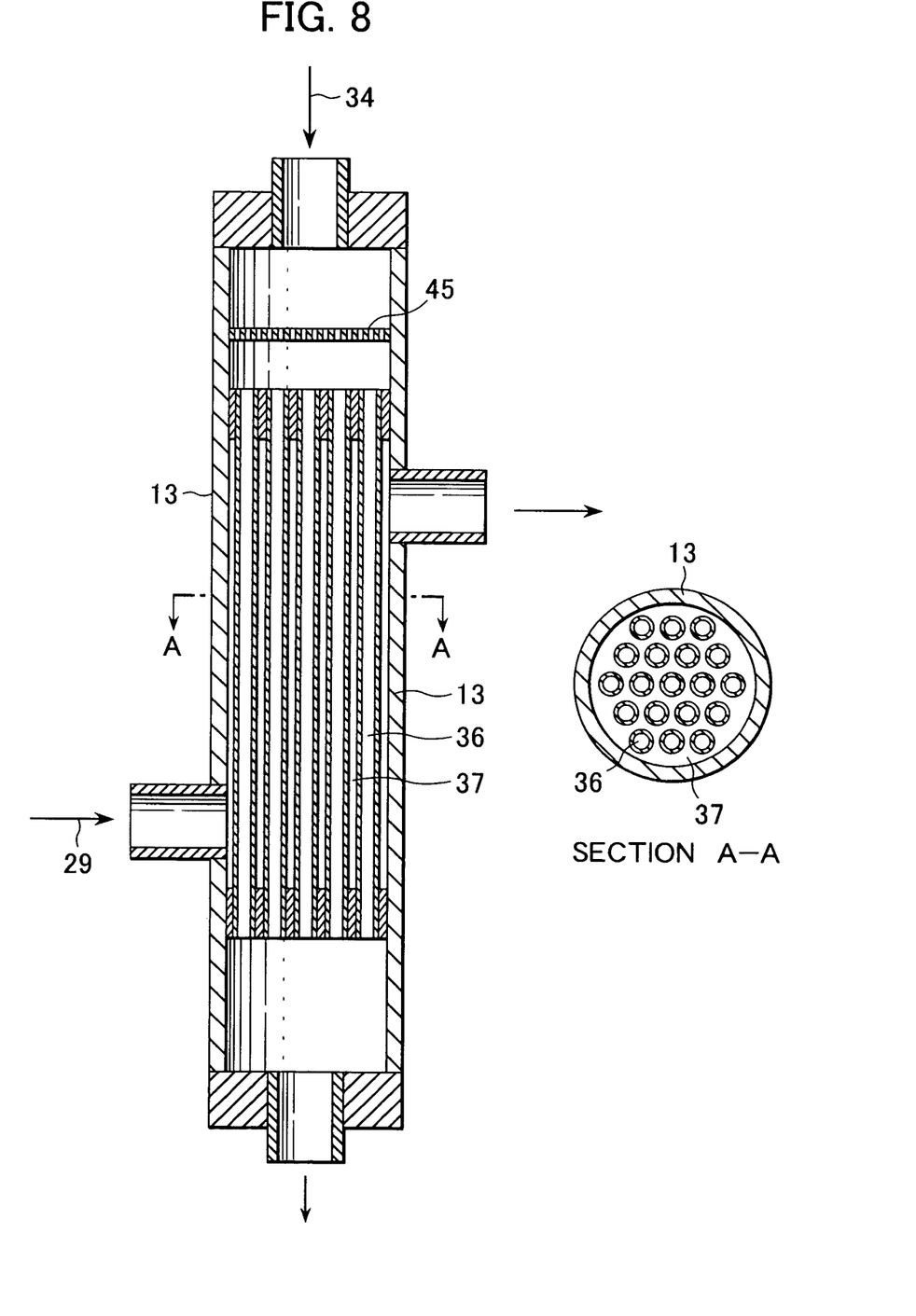
FIG. 8 is a sectional view of a first modification of a reforming preheater according to the present invention.

FIG. 8 shows a first modification of the reforming preheater 13 shown in FIG. 7. A section A-A thereof is also illustrated in FIG. 8. A multitude of heat exchanger tubes 36 are arranged in the reforming preheater 13. Each of the heat exchanger tubes 36 is arranged in the vertical direction so that the mixed fluid 34 flows therethrough from the upside to the downside. By reducing the diameter of each of the heat exchanger tubes 36, the wall thickness thereof can be made thin, as well as the speed of the mixed fluid 34 flowing through each of the heat exchanger tubes can be high, so that the amount of heat transfer from the steam 29 for heating reforming preheater to the mixed fluid 34 can be increased.

Figure 9:
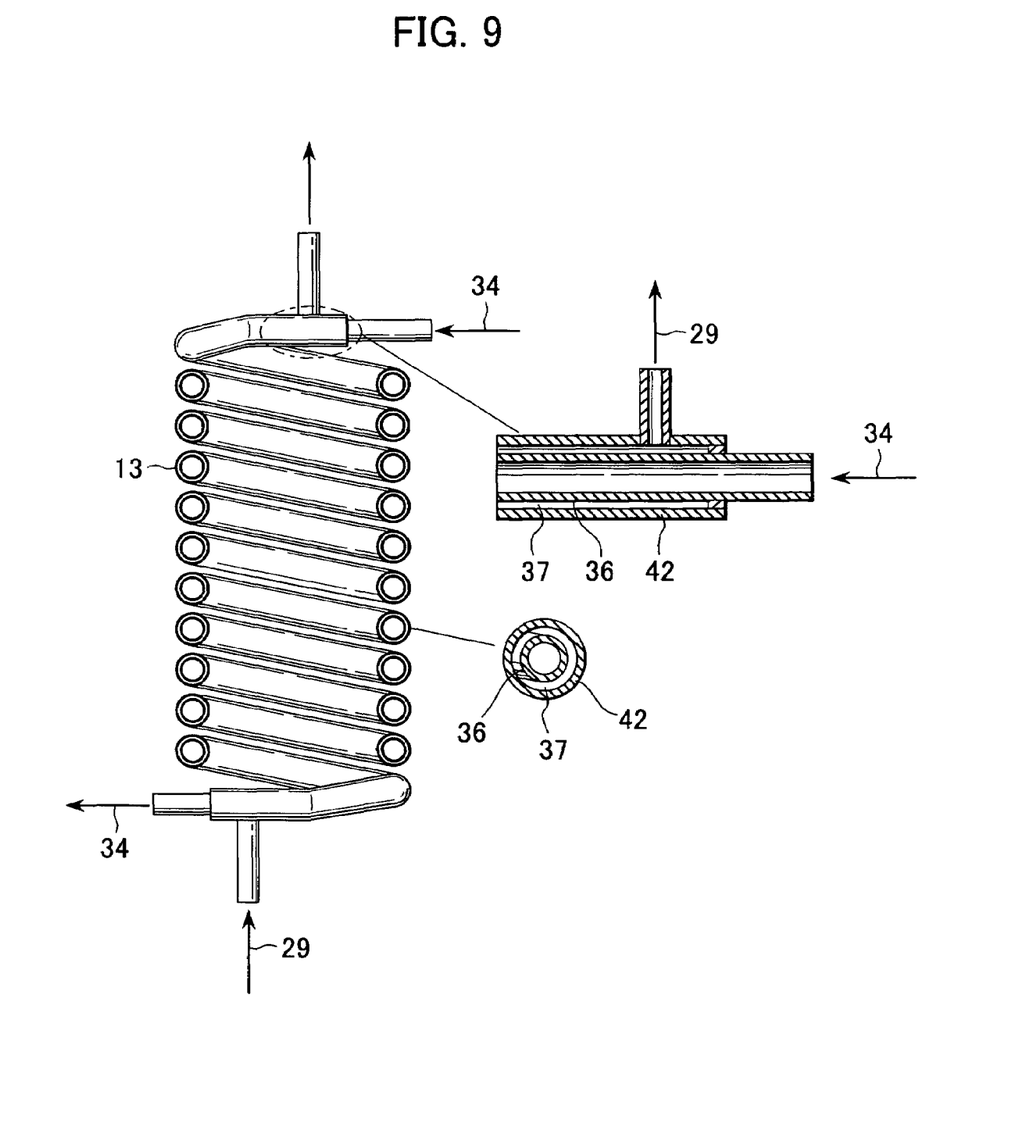
FIG. 9 is a diagram showing a second modification of a reforming preheater according to the present invention.

FIG. 9 shows a second modification of the reforming preheater 13 shown in FIG. 7. The reforming preheater 13 according to this modification has a double tube structure in which a spiral heat exchanger tube 36 is covered with an outer tube 42. The steam 29 for heating reforming preheater flows through the annular steam flow path 37. By reducing the gap between the inner tube and outer tube of the double tube, the heat transfer between the outer surface of the heat exchanger tube 36 and the steam 29 for heating reforming preheater can be made large, as well as there is no need for a thick-walled vessel required for the resistance to steam pressure, so that the reduction in the weight and size of the system can be achieved.

As described above, the present invention allows the mixed fluid to react in a short time in the reformer without raising the temperature of steam for heating the heavy oil more than necessary, or without making the height of the reformer larger than necessary. The heavy oil reforming system according to the present invention is an optimum one as a reforming system in a system requiring a large amount of reformed fuel.

What is claimed is:

1. A heavy oil reforming system, comprising:
   a gas-liquid mixer for mixing a high pressure heavy oil and high pressure steam;
   a reforming preheater raising the temperature of the mixed fluid having been mixed in the gas-liquid mixer UD to a temperature from 350 to 550° C. for reforming reaction; and
   a reformer kept at the temperature for reforming reaction, the reformer causing the mixed fluid having been heated by the reforming preheater to reside there, and thereby reforming the heavy oil,
   wherein the reforming preheater is configured to heat an exchanger tube through which the mixed fluid flows, from the outside by a heating medium;
   wherein the heat exchanger tube is arranged so that the entrance side thereof into which the mixed fluid flows is disposed at a position higher than the exit side thereof from which the mixed fluid flows out, and has a spiral structure;
   wherein the spiral is formed in the vertical direction; and
   wherein the heat exchanger tube having the spiral structure is covered with an outer tube to thereby take on a double tube structure, and is configured so that a heating medium flows between the heat exchanger tube and the outer tube.

2. A heavy oil reforming system, comprising:
   a gas-liquid mixer for mixing a high pressure heavy oil and high pressure steam;
   a reforming preheater raising the temperature of the mixed fluid having been mixed in the gas-liquid mixer up to a temperature from 350 to 550° C. for reforming reaction; and
   a reformer kept at the temperature for reforming reaction, the reformer causing the mixed fluid having been heated by the reforming preheater to reside there, and thereby reforming the heavy oil,
   wherein the reforming preheater is configured to heat an exchanger tube through which the mixed fluid flows, from the outside by a heating medium;
   wherein the heat exchanger tube is arranged so that the entrance side thereof into which the mixed fluid flows is disposed at a position higher than the exit side thereof from which the mixed fluid flows out, and has a spiral structure;
   wherein the spiral is formed in the vertical direction; and
   wherein the reformer has a descending flow path configured so that the mixed fluid flows therethrough in a downward direction, and an ascending flow path configured so that, subsequently, the mixed fluid turns around and flows therethrough in an upward direction.

3. A heavy oil reforming system, comprising:
   a gas-liquid mixer for mixing a high pressure heavy oil and high pressure steam;
   a reforming preheater raising the temperature of the mixed fluid having been mixed in the gas-liquid mixer up to a temperature from 350 to 550° C. for reforming reaction; and
   a reformer kept at the temperature for reforming reaction, the reformer causing the mixed fluid having been heated by the reforming preheater to reside there, and thereby reforming the heavy oil,
   wherein the reforming preheater is configured to heat an exchanger tube through which the mixed fluid flows, from the outside by a heating medium;
   wherein the heat exchanger tube is arranged so that the entrance side thereof into which the mixed fluid flows is disposed at a position higher than the exit side thereof from which the mixed fluid flows out and has a spiral structure;
   wherein the spiral is formed in the vertical direction;
   wherein the reformer has a thermal insulation jacket; and
   wherein a medium having been heated up to a temperature higher than that of the mixed fluid having been heated by the reforming preheater, is supplied into the thermal insulation jacket.

4. A heavy oil reforming system, comprising:
   a gas-liquid mixer for mixing a high pressure heavy oil and high pressure steam;
   a reforming preheater raising the temperature of the mixed fluid having been mixed in the gas-liquid mixer up to a temperature from 350 to 550° C. for reforming reaction; and a reformer kept at the temperature for reforming reaction, the reformer causing the mixed fluid having been heated by the reforming preheater to reside there, and thereby reforming the heavy oil, wherein the reforming preheater is configured to heat an exchanger tube through which the mixed fluid flows, from the outside by a heating medium;

wherein the heat exchanger tube is arranged so that the entrance side thereof into which the mixed fluid flows is disposed at a position higher than the exit side thereof from which the mixed fluid flows out and has a spiral structure;

wherein the spiral is formed in the vertical direction;

wherein the steam for heavy oil reforming, to be introduced into the gas-liquid mixer is produced by an exhaust heat recovery steam boiler that recovers heat held by exhaust gas from a gas turbine to thereby produce steam;

wherein the reforming preheater and the reformer are disposed inside the exhaust heat recovery steam boiler; and wherein the mixed fluid having entered the reforming preheater is heated by exhaust gas from the gas turbine, and the mixed fluid having entered the reformer is thermally insulated with the exhaust gas from the gas turbine.

5. A heavy oil reforming system, comprising:

a gas-liquid mixer for mixing a high pressure heavy oil and high pressure steam;

a reforming preheater raising the temperature of the mixed fluid having been mixed in the gas-liquid mixer up to a temperature from 350 to 550° C. for reforming reaction; and a reformer kept at the temperature for reforming reaction, the reformer causing the mixed fluid having been heated by the reforming preheater to reside there, and thereby reforming the heavy oil, wherein the reforming preheater is configured to heat an exchanger tube through which the mixed fluid flows, from the outside by a heating medium;

wherein the heat exchanger tube is arranged so that the entrance side thereof into which the mixed fluid flows is disposed at a position higher than the exit side thereof from which the mixed fluid flows out, and has a spiral structure;

wherein the spiral is formed in the vertical direction;

wherein the steam for heavy oil reforming, to be introduced into the gas-liquid mixer is produced by an exhaust heat recovery steam boiler that recovers heat held by exhaust gas from a gas turbine to thereby produce steam; and a heat exchanger receiving heat from the exhaust heat recovery steam boiler and thereby heating gas, and wherein the reformer is thermally insulated with the gas.

6. A combined cycle power system comprising:

a gas-liquid mixer for mixing a high pressure heavy oil and high pressure steam;

a reforming preheater raising the temperature of the mixed fluid having been mixed in the gas-liquid mixer up to a temperature from 350 to 550° C. for reforming reaction;

a reformer kept at the temperature for reforming reaction, the reformer causing the mixed fluid having been heated by the reforming preheater to reside there, and thereby reforming the heavy oil;

a gas turbine driven by combustion has obtained by burning the reformed oil generated by the reformer;

a steam boiler producing steam by recovering heat held by exhaust gas from the gas turbine; and a steam turbine driven by the steam produced by the steam boiler, wherein the reforming preheater is configured to heat an exchanger tube through which the mixed fluid flows, from the outside by a heating medium;

wherein the heat exchanger tube is arranged so that the entrance side thereof into which the mixed fluid flows is disposed at a position higher than the exit side thereof from which the mixed fluid flows out, and has a spiral structure;

wherein the spiral is formed in the vertical direction;

wherein power generation is performed by each of the gas turbine and the steam wherein steam for heavy oil reforming to be introduced into the reformer, is produced by the steam boiler;

wherein the reforming preheater and the reformer are disposed inside the exhaust heat recovery steam boiler; and wherein the mixed fluid having entered the reforming preheater is heated by exhaust gas from the gas turbine, and the mixed fluid having entered the reformer is thermally insulated with the exhaust gas from the gas turbine.

7. A combined cycle power system comprising:

a gas-liquid mixer for mixing a high pressure heavy oil and high pressure steam;

a reforming preheater raising the temperature of the mixed fluid having been mixed in the gas-liquid mixer up to a temperature from 350 to 550° C. for reforming reaction;

a reformer kept at the temperature for reforming reaction, the reformer causing the mixed fluid having been heated by the reforming preheater to reside there, and thereby reforming the heavy oil;

a gas turbine driven by combustion gas obtained by burning the reformed oil generated by the reformer;

a steam boiler producing steam by recovering heat held by exhaust gas from the gas turbine; and a steam turbine driven by the steam produced by the steam boiler, wherein the reforming preheater is configured to heat an exchanger tube through which the mixed fluid flows, from the outside by a heating medium;

wherein the heat exchanger tube is arranged so that the entrance side thereof into which the mixed fluid flows is disposed at a position higher than the exit side thereof from which the mixed fluid flows out, and has a spiral structure;

wherein the spiral is formed in the vertical direction;

wherein power generation is performed by each of the gas turbine and the steam turbine;

wherein steam for heavy oil reforming to be introduced into the reformer, is produced by the steam boiler; and a heat exchanger receiving heat from the steam boiler and thereby heating gas, wherein the reformer is thermally insulated with the heated gas.

* * * * *